United States Patent [19]

Yasuda et al.

[11] Patent Number: 4,474,944

[45] Date of Patent: Oct. 2, 1984

[54] EPOXIDIZED POLYETHER AND PROCESS FOR PRODUCING THE SAME

[75] Inventors: Kenji Yasuda, Kyoto; Yasuaki Yokoyama; Shuichi Matsumoto, both of Yokohama; Kunihiro Harada, Machida, all of Japan

[73] Assignee: Japan Synthetic Rubber Co., Ltd., Tokyo, Japan

[21] Appl. No.: 482,801

[22] Filed: Apr. 7, 1983

[30] Foreign Application Priority Data

Apr. 14, 1982 [JP] Japan .................................. 57-60930

[51] Int. Cl.³ ...................... C08G 65/20; C08G 65/24; C08G 59/72
[52] U.S. Cl. .................................. 528/408; 528/417; 549/516; 549/555
[58] Field of Search .............. 549/516, 555; 528/408, 528/417

[56] References Cited

U.S. PATENT DOCUMENTS 3,004,952 10/1961 Brueschweiler et al. ............ 528/408
3,023,224 2/1962 Meyer et al. ......................... 549/555
3,310,508 3/1967 Vandenberg ......................... 528/417

Primary Examiner—John Kight
Assistant Examiner—Garnette D. Draper
Attorney, Agent, or Firm—Oblon, Fisher, Spivak, McClelland & Maier

[57] ABSTRACT

An epoxidized polyether, characterized by containing oxytetramethylene units and having in one molecule 0.9 or more epoxy groups on the average represented by the general formula (I):

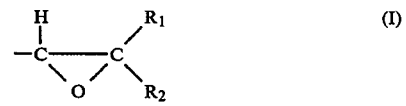

wherein $R_1$ and $R_2$, which may be the same or different, are hydrogen atoms or alkyl groups. An epoxy resin obtained from said epoxidized polyether alone or in admixture with an ordinary epoxy compound has a high flexibility.

9 Claims, No Drawings

EPOXIDIZED POLYETHER AND PROCESS FOR PRODUCING THE SAME

BACKGROUND OF THE INVENTION

1. Field of the Invention

This invention relates to a novel epoxidized polyether.

2. Description of the Prior Art

Most of epoxy resins now industrially produced comprise an epoxy compound of bisphenol A type as the main constituent, and are widely used in fields of electrically insulating materials, coating materials, laminates, structure materials, materials for civil engineering and construction, and the like by taking advantage of characteristics of the epoxy resins such as toughness, heat resistance, chemical resistance, adhesion, etc. This is because epoxy resins of bisphenol A type have, in the molecule, not only highly reactive epoxy groups but also bisphenol A residues capable of imparting heat resistance and hydroxyl groups capable of imparting adhesion. There are found substantially no other resins having such various characteristics. The epoxy compound as the main constitutent is hardly used alone and, in usual, it can exhibit excellent characteristics by incorporation of additives, for example, curing agents such as polymethylenediamine, polyetherdiamine, isophoronediamine, methaphenylenediamine, 2,4-toluenediamine, phthalic anhydride, maleic anhydride and the like; reactive diluents such as styrene oxide, glycidyl methacrylate, allyl glycidyl ether, diglycidyl ether and the like; fillers such as silica, mica, quartz powder and the like; and cure accelerators such as phenol, bisphenol A, salicylic acid, tin octylate and the like.

Various characteristics can be imparted to epoxy resins by properly adjusting the kinds and amounts of these additives, and this is one of the reasons why epoxy resins are used for various purposes.

Epoxy resins have excellent characteristics as described above, but with the development of required performance characteristics in various uses, it has become apparent that they still have various points required to be improved. One of the points is that conventional epoxy resins are poor in flexibility. That is to say, epoxy resins of bisphenol A type are generally poor in softness, and particularly when they are used in coating materials for elastic body, cracks are very liable to be formed. This has been an industrially serious defect.

Under these circumstances, extensive research has come to be conducted on imparting a high flexibility to epoxy resins. As one aspect of the research, there is known a method by which an elastomer is merely blended with epoxy resins. However, this method requires sufficiently reproducible dispersion of an elastomer having a suitable particle size, and hence, is technically very difficult and industrially very disadvantageous. Accordingly, research has gradually become active on reactive flexibility-imparting agents having in the molecule an elastic skeleton for imparting a high flexibility to epoxy resins, and various flexibility-imparting agents have been developed.

However, under the existing circumstances, there has not yet been obtained any flexibility-imparting agent which is satisfactory in all of the miscibility with an epoxy compound as the main constituent or a curing agent, various characteristics of the epoxy resin such as mechanical characteristics, impact resistance and the like, and the production cost thereof.

On the other hand, polyoxytetramethylene glycols known as materials for polyurethanes and polyesters are, in general, produced by subjecting tetrahydrofuran to ring-opening polymerization. Polyoxytetramethylene glycols are reactive polymers in which a hydroxyl group is attached to either end of the molecule, and particularly when they are used as materials for polyurethanes and reacted with a diisocyanate, the resulting polyurethanes are superior to those obtained by using other polymer glycols as materials in mechanical characteristics and hydrolysis resistance. Therefore, polyoxytetramethylene glycols have come to be widely used as industrially important materials. Polyoxytetramethylene glycols have a structure in which its skeleton comprises regularly repeated oxytetramethylene units, and this is presumed to make the mechanical characteristics and strength excellent.

In view of the circumstances described above, the present inventors have conducted extensive research to find that epoxidized polyethers containing oxytetramethylene units give an epoxy resin having a high flexibility and moreover various excellent characteristics.

SUMMARY OF THE INVENTION

The object of this invention is to provide a novel epoxidized polyether which, when used as a material for epoxy resin, can give an epoxy resin having a high flexibility and moreover excellent characteristics, and permits the industrially advantageous production of an epoxy resin.

According to this invention, there is provided an epoxidized polyether containing oxytetramethylene units and having in one molecule 0.9 or more epoxy groups on the average represented by the general formula (I):

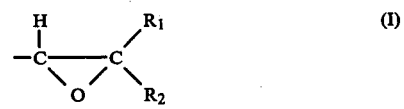

wherein $R_1$ and $R_2$, which may be the same or different, are hydrogen atoms or alkyl groups. In the general formula (I), each of $R_1$ and $R_2$ is preferably a hydrogen atom or a $C_{1-5}$ alkyl group such as a methyl group or an ethyl group, particularly preferably a hydrogen atom.

DETAILED DESCRIPTION OF THE PREFERRED EMBODIMENT

The epoxidized polyether can be produced, for example, in the following way:

(Production Process 1)

A process for producing an epoxidized polyether by polymerizing tetrahydrofuran, in the presence or absence of an inert solvent, in the presence of the following three components: (A) a component consisting of at least one member selected from the group consisting of Lewis acids and ether complexes of Lewis acids, (B) a component consisting of an epihalohydrin, and (C) a component consisting of a compound having one or more hydroxyl groups in one molecule, thereby obtaining a hydroxypolyether, and then subjecting it to dehydrohalogenation treatment.

(Production Process 2)

A process for producing an epoxidized polyether by allowing a polyoxytetramethylene glycol to react, in the presence or absence of an inert solvent, together with (D) a component consisting of at least one member selected from the group consisting of Lewis acids and ether complexes of Lewis acids and (E) a component consiting of an epihalohydrin, thereby obtaining a hydroxypolyether, and then subjecting it to dehydrohalogenation treatment.

As the Lewis acids and the ether complexes of Lewis acids which may be used as the components (A) and (D) in the above-mentioned Processes 1 and 2, there may preferably be used, from the viewpoint of the ease of handling and good catalytic action, metal halides and nonmetal halides such as boron trifluoride, phosphorus pentafluoride, arsenic pentafluoride, antimony pentafluoride, antimony pentachloride, aluminum chloride, aluminum fluoride stannic chloride, titanium chloride, ferric chloride and the like; solid acids such as silicon dioxide, aluminum oxide, zinc oxide, silicon dioxide-aluminum oxide and the like; complexes of boron trifluoride, phosphorus pentafluoride, antimony pentafluoride or the like with a chain or cyclic ether such as dimethyl ether, diethyl ether, dibutyl ether, tetrahydrofuran, anisole or the like; etc. The most preferable components (A) and (D) are boron trifluoride, phosphorus pentafluoride, arsenic pentafluoride, antimony pentafluoride, aluminum chloride, stannic chloride, and complexes of boron trifluoride, phosphorus pentafluoride or antimony pentafluoride with dimethyl ether, diethyl ether, dibutyl ether, tetrahydrofuran or anisole in view of easy availability and catalyst activity.

As the epihalohydrins which may be used as the components (B) and (E) in the above-mentioned Production Processes 1 and 2, there are epifluorohydrin, epichlorohydrin, epibromohydrin and epiiodohydrin, among which epichlorohydrin and epibromohydrin may preferably be used from the viewpoint of their high availability and good catalytic action.

As the compound having one or more hydroxyl groups in one molecule which is used as the component (C) in the above-mentioned Production Process 1, there may be used, for example, monofunctional ones such as methyl alcohol, ethyl alcohol, n-butyl alcohol and the like; bifunctional ones such as ethylene glycol, trimethylene glycol, 1,4-butanediol, 2,3-butylene glycol, pentamethylene glycol and the like; trifunctional ones such as trimethylolpropane, glycerol and the like; tetrafunctional ones such as diglycerol, pentaerythritol and the like; pentafunctional ones such as glucose and the like; heptafunctional ones such as heptitol and the like; and octafunctional ones such as octitol, lactose and the like. Among them preferable are mono- to penta-functional ones, and in particular, methyl alcohol, ethyl alcohol, n-butyl alcohol, ethylene glycol, 1,4-butanediol, trimethylolpropane and diglyceride can be said to be preferable from the viewpoint of their inexpensiveness, high availability and the like.

For the dehydrohalogenation treatments in the above-mentioned Production Processes 1 and 2, a dehydrohalogenating agent, for example, a basic substance is used, and as the basic substance, there may preferably be used, for instance, calcium hydroxide, lithium hydroxide, sodium hydroxide, potassium hydroxide, collidine and aqueous solutions or alcohol solutions thereof, from the viewpoint of their reactivity, high availability and cost. There are particularly preferably used aqueous solutions of sodium hydroxide or potassium hydroxide of 5 to 45% by weight.

As the polyoxytetramethylene glycol used in the above-mentioned Production Process 2, those having a number average molecular weight of 300 to 20,000 are preferable, and those having a number average molecular weight of 500 to 10,000 are more preferable, but the molecular weight is not critical.

In the above-mentioned Production Process 1, it is preferable to effect the reaction under the conditions that the amounts of tetrahydrofuran, the component (A), the component (B) and the component (C) used and quantitative relationship among these components satisfy the following conditions (1), (2) and (3):

Condition (1) is that the component (A)/tetrahydrofuran (molar ratio) is 0.001 to 0.1, particularly preferably 0.005 to 0.05. When said molar ratio is less than 0.001, the catalytic action of the component (A) is reduced; the yield of a hydroxypolyether, an intermediate product, becomes low; hydroxypolyethers low in functionality as hydroxyl group are formed; and consequently, the yield of the resulting epoxidized polyether is lowered, and the epoxidized polyether is low in functionality as epoxy group. On the other hand, when the molar ratio exceeds 0.1, an unnecessarily large amount of the component (A) should be used, so that not only does the cost become high, but the removal of the component (A) from the hydroxypolyether which, if necessary, is conducted prior to dehydrohalogenation treatment becomes difficult, resulting in a hindrance to epoxidation sometimes.

The condition (2) is that the component (B)/tetrahydrofuran (molar ratio) is 0.2 or less, particularly preferably 0.05 or less. When said molar ratio exceeds 0.2, the copolymerization of tetrahydrofuran with an epihalohydrin as the component (B) takes place, and the regularity of tetraoxymethylene units in a hydroxypolyether, an intermediate product, is disturbed, so that the resulting epoxidized polyether possesses a lowered functionality as epoxy group.

The condition (3) is that the component (B)/hydroxyl groups in the component (C) (mole/gram equivalent) is 0.5 to 5, more preferably 0.5 to 3, still more preferably 0.8 to 2, most preferably 1 to 1.25. When said ratio is less than 0.5, a considerable amount, for example, 50% or more, of the hydroxyl groups of a hydroxypolyether, an intermediate product, are primary, so that an epoxidized polyether obtained by subjecting the hydroxypolyether to dehydrohalogenation treatment has a lowered functionality as epoxy group. On the other hand, when the said ratio exceeds 5, an epihalohydrin as the component (B) is present in a copolymerized form in a hydroxypolyether, an intermediate product, in a considerable proportion.

Also in the above-mentioned Production Process 2, it is similarly preferable to effect the reaction under the conditions that the amounts of polyoxytetramethylene glycol, the component (D) and the component (E) used and the quantitative relationship among them satisfy the following conditions (4) and (5):

The condition (4) is that the component (D)/hydroxyl groups in the polyoxytetramethylene glycol (mole/gram equivalent) is 0.02 to 2, particularly preferably 0.1 to 1. When said ratio is less than 0.02, the catalytic action of the component (D) is weakened. On the other hand, when the said ratio exceeds 2, an unnecessarily large amount of the component (D) must be used, resulting in a high cost.

The condition (5) is that the component (E)/hydroxyl groups in the polyoxytetramethylene glycol (mole/gram equivalent) is 0.5 to 3, more preferably 0.8 to 2, still more preferably 1 to 1.25. When the said ratio is less than 0.5, the resulting epoxidized polyether has a lowered functionality. On the other hand, when the aforesaid ratio exceeds 3, a homopolymer of an epihalohydrin as the component (E) is produced as a by-product.

When solid acids are used as the component (A) and the component (D), it is sufficient that they are used in an amount corresponding to the above-mentioned conditions, calculated from the acidity (millimole/gram of solid acid) of each solid acid as a Lewis acid which is measured by a well-known method, e.g., a method described in Shiba et al., "Catalyst" Vol. 4, p. 58.

In the above-mentioned Production Processes 1 and 2, the amount of a dehydrohalogenating agent used for carrying out each dehydrohalogenation treatment is, in usual, preferably within the range of 0.5 to 4 equivalents, particularly preferably 0.9 to 2 equivalents, based on the secondary hydroxyl groups represented by the structural formula (II) shown below in a hydroxypolyether, an intermediate product, because when said amount is too small, the epoxidation does not go to completion, and when it is too large, the epoxy groups formed tend to undergo ring-opening reaction again:

wherein $R_1$ and $R_2$, which may be the same or different, are hydrogen atoms or alkyl groups, and X is a halogen atom.

That the secondary hydroxyl groups in the hydroxypolyether are those represented by the above structural formula (II) can be understood from the fact that as described hereinafter, almost all the secondary hydroxyl groups are converted into epoxy groups by treatment with a dehydrohalogenating agent.

The representative structures of epoxidized polyethers obtained according to the above-mentioned Production Process 1 are presumed as follows: When, for example, a glycol is used as the component (C), oxytetramethylene units are bonded to both ends of the glycol residue and extented therefrom in two opposite directions; when a triol is used, they are bonded to and extended from the triol residue in three directions; and when a tetraol is used, they are bonded to and extended from the tetraol residue in four directions. And a group having an epoxy group represented by the general formula (I) is bonded to the end of each unit. The representative structure of an epoxidized polyether obtained according to the above-mentioned Production Process 2 is presumed to be a structure in which a group having an epoxy group represented by the general formula (I) is bonded to each end of the polyoxytetramethylene glycol residue.

In the above-mentioned Production Process 1, tetrahydrofuran is polymerized in the presence of three components of the component (A), the component (B) and the component (C), and if necessary, a suitable solvent may be used in said polymerization. As the solvent, there may be used any of those which are inert to tetrahydrofuran and the catalyst system described above, such as hydrocarbons and halogenated hydrocarbons. Although a method of adding the component (A), the component (B) and the component (C) is not critical, a method comprising mixing the component (A) and the component (C) with tetrahydrofuran and then adding the component (B), or a method comprising mixing the component (B) and the component (C) with tetrahydrufuran and then adding the component (A) is convenient from the viewpoint of ease of control of the polymerization. Although the polymerization temperature is not critical so long as it is lower than the ceiling temperature for the polymerization of tetrahydrofuran, it is preferably within the range of −20° C. to 40° C. from the viewpoint of polymerization rate and yield. In effecting the polymerization, it is preferable to place the polymerization system in an atmosphere of an inert gas such as nitrogen, argon or the like.

In the above-mentioned Production Process 2, a method of adding the polyoxytetramethylene glycol, the component (D) and the component (E) is not critical, but in usual, a method comprising mixing the component (D) with the polyoxytetramethylene glycol and then adding the component (E), or a method comprising mixing the component (E) with the polyoxytetramethylene glycol and then adding the component (D) is convenient. The reaction temperature is preferably within the range of −20° C. to +50° C. because when it is extremely high, the polyoxytetramethylene glycol is liable to decompose and when it is extremely low, the reaction rate becomes very low. For the reaction, there may be used, if necessary, a solvent which is inert to the polyoxytetramethylene glycol and the above-mentioned three components (A), (B) and (C). In effecting the reaction, it is preferable to place the reaction system in an inert gas atmosphere.

In the above-mentioned Production Processes 1 and 2, when a hydroxypolyether, an intermediate product, is subjected to dehydrohalogenation treatment, a hydroxypolyether solution obtained in the reaction process may be subjected as it is to dehydrohalogenation treatment without particularly recovering therefrom the hydroxypolyether. There may also be used a method which comprises terminating the reaction, in the course of the production of a hydroxypolyether, by a well-known method, for example, by adding an alkali such as aqueous ammonia, an aqueous sodium hydroxide solution or the like at a low temperature, by adding a small amount of an amine or by adding a large amount of water, subsequently recovering the hydroxypolyether, and subjecting it to dehydrohalogenation treatment. In recovering the hydroxypolyether, it is usually washed after the termination of the reaction in order to remove the component (A) and (D), etc., and for the washing, an alkaline aqueous solution, an aqueous solution of a neutral salt such as potassium dihydrogenphosphate or water is used. In order to recover the hydroxypolyether easily from a mixture thereof with such an aqueous solution or water, it can be extracted by adding a solvent which is immiscible with water. When the above-mentioned Production Process 1 is employed, unreacted tetrahydrofuran is present in the reaction mixture, and it is recovered by distillation, steam stripping or the like before or after washing, and if necessary, may be reused. The hydroxypolyether after washing is purified and recovered by drying, filtration of the resulting salt, and the like.

When the recovered hydroxypolyether is subjected to dehydrohalogenation treatment, the treatment temperature is not critical, but from the viewpoint of reaction rate and yield, it is preferably from −10° C. to +120° C., more preferably 0° C. to 80° C. If necessary, the viscosity of the reaction system may be lowered by adding thereto a suitable solvent, for example, ethyl alcohol, tertiary butyl alcohol or the like.

The amount of a dehydrohalogenating agent used in the case where dehydrohalogenation treatment is carried out without recovering the hydroxypolyether can be presumed to be the sum of the amount calculated from the amount of secondary hydroxyl group represented by the formula (II) determined after sampling a part of unrecovered hydroxypolyether and purifying the same plus the amounts required for neutralizing the components (A) and (D).

In the case where the component (A) or the component (D) is adsorbed and removed by use of a solid alkali at a low temperature prior to dehydrohalogenation treatment, the above-mentioned amount of the secondary hydroxyl group is determined, and an amount calculated therefrom can be presumed to be the amount of a dehydrohalogenating agent used.

In order that after dehydrohalogenation treatment, an epoxidized polyether may be purified and recovered from the reaction mixture, a well-known method may be used. There may be exemplified, for example, a method by which the resulting salt is filtered as it is after the dehydrohalogenation treatment or it is subjected to heating, evacuation and dehydration and the deposited material is then filtered and if necessary, concentrated; a method by which the reaction mixture is dehydrated by use of a dehydrating agent such as anhydrous sodium sulfate or by adding a solvent which forms an azeotropic mixture with water and azeotropically evaporating the resulting mixture, and thereafter subjected to heating, evacuation and then concentration; and a method by which the reaction mixture is washed with water until the system becomes neutral, thereafter concentrated and then dried. In these methods, a suitable solvent may be added in order to increase the recovery of an epoxidized polyether.

Among these methods, preferable is a method by which the reaction mixture after the dehydrohalogenation treatment is subjected to heating, evacuation and then dehydration, or is dehydrated by adding a solvent having a relatively low boiling point which forms an azeotropic mixture with water and azeotropically evaporating the resulting mixture, and the resulting salt and the unreacted alkali are removed by filtration, and if necessary, the residue is concentrated, considering that epoxy groups are relatively unstable in a dilute aqueous alkali solution and the alkali number in the epoxidized polyether after purification is required to be kept low.

The number average molecular weight of the epoxidized polyether obtained in the manner described above can widely be varied by properly determining reaction conditions for synthesizing a hydroxypolyether, an intermediate product, but when the epoxizided polyether is used as a material for an epoxy resin, its number average molecular weight is preferably 300 to 20,000 more preferably 500 to 10,000.

As can be understood also from Examples appearing hereinafter, the thus obtained epoxidized polyether contains oxytetramethylene units and has in one molecule 0.9 or more, preferably 0.9 to 10 (on the average) epoxy groups represented by the general formula (I).

The oxytetramethylene unit content by weight of the molecule of the epoxidized polyether of this invention is preferably 60% or more, particularly preferably 70% or more. When it is less than 60%, an epoxy resin obtained when said epoxidized polyether is used as a material is deteriorated in mechanical characteristics and the like.

The main structures contained in the epoxidized polyether of this invention are the structure represented by the general formula (I) and the oxytetramethylene unit. However, the epoxidized polyether has the residue of the component (C) and optionally the epihalohydrin residue and the like, in addition to the above main structures.

As the epoxidized polyether of this invention, preferred are those in which the residual amount of halogen atoms (the average number) contained in one molecule is not more than the value (N) given by the equation (III) shown below in consideration of the electrically insulating property of an epoxy resin obtained therefrom:

$$N = 3 \times f - S \quad \text{(III)}$$

wherein f is the functionality as epoxy group of the epoxidized polyether expressed by $$\frac{\text{Number average molecular weight}}{\text{Epoxy equivalent (g/equiv.)}},$$

and S is the average number of secondary hydroxy groups represented by the structural formula (II) present in one molecule of the epoxidized polyether.

The epoxidized polyether of this invention contains oxytetramethylene units and has in one molecule 0.9 or more, on the average, of epoxy groups represented by the general formula (I), and therefore, when it is used as a material for epoxy resin, the resulting epoxy resin is high in flexibility and moreover excellent in various characteristics such as mechanical characteristics, impact resistance and the like. Although the epoxidized polyether of this invention can give an epoxy resin when used alone, it can give an epoxy resin also when used in the form of a mixture with other epoxy compounds, for example, bisphenol A, and in this case, since said epoxidized polyether contains ether linkages in its polymer chain, it is very good in miscibility with other epoxy compounds and curing agents usually used as additives, and hence can easily impart a high flexibility to the resulting epoxy resin. Therefore, it is industrially very advantageous.

Examples of this invention are explained below, but this invention is not limited thereto.

EXAMPLE 1

A 7-liter glass autoclave equipped with a stirrer, a coiled condenser, a thermometer and an inlet and an outlet for nitrogen gas was purged with nitrogen gas, after which 3,010 g (41.8 moles) of dehydrated tetrahydrofuran, 189 g (2.05 moles) of dehydrated epichlorohydrin and 60.6 g (0.976 mole) of dehydrated ethylene glycol were charged thereinto. Subsequently, 29.7 g (0.209 mole) of boron trifluoride-diethyl etherate was added with stirring, while the mixture was maintained at a temperature of 20° C., and reaction was effected at a temperature of 20° C. for 4 hours, after which the reaction was terminated by the addition of 2 liters of distilled water. After completion of the reaction, the amount of unreacted tetrahydrofuran was determined by a gas chromatography to find that the conversion of tetrahydrofuran into a hydroxypolyether was 41%. Subsequently, unreacted tetrahydrofuran was distilled off under a vacuum of about 100 mmHg while the reaction mixture was stirred, and 2 liters of toluene was then added, after which the resulting mixture was stirred for 15 minutes and then allowed to stand, and the separated aqueous layer fraction was removed. To the thus obtained oil layer fraction was added 1 liter of distilled water, after which the resulting mixture was stirred for 15 minutes and then allowed to stand, and the thus separated aqueous layer fraction was removed. The same procedure as described above was further repeated twice to conduct washing until the pH of the resulting separated aqueous layer fraction became 7, after which the organic layer fraction was taken out and then filtered through a filter paper. The toluene was completely removed by distillation from the resulting filtrate by means of a rotary evaporator to obtain about 1,300 g of a colorless, liquid hydroxypolyether, which is hereinafter referred to as "Hydroxypolyether 1A".

The number average molecular weight of hydroxypolyether 1A was measured, by means of a vapor pressure osmosis type apparatus for measuring molecular weight, to find it to be 1,500. The hydroxyl value thereof obtained by phthalation reaction according to the method of JIS K 1557-1970 was 74.7 (mgKOH/g). The number of hydroxyl groups per molecule of Hydroxypolyether 1A calculated from the number average molecular weight and the hydroxyl value, namely, the functionality thereof as hydroxyl group was 2.0.

Subsequently, 0.25 g of Hydroxypolyether 1A and 0.4 g of trichloroacetyl isocyanate were mixed in a sample tube for NMR (nuclear magnetic resonance absorption), and after about 30 minutes, the NMR spectrum of the resulting product was measured. In the spectrum thus obtained a signal due to a reaction product of the secondary hydroxyl group with the isocyanate was observed at 5.2 ppm based on the signal due to tetramethylsilane added as an internal standard. On the other hand, a polyoxytetramethylene glycol having primary hydroxyl groups shows a signal due to a reaction product of the primary hydroxyl group with the isocyanate at 4.2 ppm, however no signal was observed at this position in the case of the sample of the present Example, that is to say, the presence of any primary hydroxyl group was not confirmed (Matsuda, "Guidance for Instrumental Analysis" published by Kagaku Dojin Sha, 1979, p. 34 was used as a reference).

Subsequently, 1,100 g of Hydroxypolyether 1A was placed in a 5-liter glass separable flask equipped with a stirrer, a thermometer and an inlet and an outlet for nitrogen gas, and said flask was purged with nitrogen gas, after which 1,000 ml of ethyl alcohol was added, and the resulting mixture was stirred to obtain a homogeneous solution. The temperature of the solution was maintained at 50° C. on an oil bath, and 587 g (1.00 equivalent based on the secondary hydroxy groups) of an aqueous sodium hydroxide solution having a concentration of 10% by weight was gradually added thereto with stirring over a period of 1 hour. After completion of the addition, the stirring was further continued for 40 minutes to carry out dehydrohalogenation treatment. After the completion of the reaction, 500 ml of toluene was added, and the temperature was raised to 70° C., after which the flask was gradually evacuated while stirring the mixture, to remove the water in the reaction mixture by azeotropic distillation. The salt formed was removed by using a 10 μm membrane filter made of Teflon, and the resulting residue was concentrated by means of a rotary evaporator to obtain 1,030 g of a colorless, liquid epoxidized polyether, which is hereinafter referred to as "Epoxidized Polyether 1B".

The number average molecular weight of Epoxidized Polyether 1B was measured by using a vapor pressure osmosis type apparatus for measuring molecular weight, to find it to be 1,430. Further, the epoxy equivalent thereof was measured by the hydrochloric acid-pyridine method ("Manual of Analytical Chemistry" second revised edition, p. 1077, Maruzen) to find it to be 726, and the functionality as epoxy group thereof was $$1,430 \div 726 = 1.97.$$

The infrared absorption spectrum of Epoxidized Polyether 1B was measured, and as a result, there were observed an absorption due to ether linkage at 1100 cm$^{-1}$, an absorption due to oxytetrametylene unit at 740 cm$^{-1}$, and an absorption due to epoxy group at 850 cm$^{-1}$, but no absorption due to hydroxyl group in the vicinity of 3400 cm$^{-1}$ was observed.

Further, 0.25 g of Epoxidized Polyether 1B and 0.1 g of benzene were mixed, and the NMR spectrum of the resulting mixture was measured. A signal due to hydrogen (represented by H$\beta$ in the formula shown below) bonded to carbons not adjacent to the oxygen atom in the oxymethylene units was observed in the vicinity of 1.6 ppm based on a signal due to tetramethylsilane, and an absorption due to hydrogen of benzene was observed in the vicinity of 7.1 ppm:

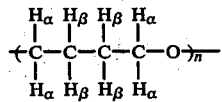

wherein n is an integer.

From the integral intensity ratio of the two and the number average molecular weight of Epoxidized Polyether 1B, the average number of the hydrogen atoms H$\beta$'s present in one molecule of Epoxidized Polyether 1B was determined to be 67.2. On the basis of this value, the oxytetramethylene unit content by weight of Epoxidized Polyether 1B was determined to be 85%.

The chlorine atom content of Epoxidized Polyether 1B was determined by the flask combustion method ("Manual of Analytical Chemistry", second revised edition, p. 273, Maruzen) to be 0.2% by weight. Accordingly, the residual amount of chlorine atoms (the average number) contained in one molecule of Epoxidized Polyether 1B was found as very small as $$\frac{0.2 \times 1,430}{35.5 \times 100} \approx 0.08.$$

EXAMPLE 2

The same 7-liter glass autoclave as in Example 1 was purged with nitrogen gas, after which 3,010 g (41.8 moles) of dehydrated tetrahydrofuran, 191 g (2.06 moles) of dehydrated epichlorohydrin, and 90.6 g (0.676 mole) of dehydrated trimethylolpropane were charged thereinto. At a temperature of 13° C., 35.1 g (0.251 mole) of a boron trifluoride-tetrahydrofuran complex was added with stirring, and reaction was effected for 5 hours while the temperature was maintained at 13° C.

The amount of unreacted tetrahydrofuran was determined by a gas chromatography to find that the conversion of tetrahydrofuran into a hydroxypolyether was 44%. Subsequently, the hydroxypolyether was recovered from the mixture in the same manner as in Example 1, which is hereinafter referred to as "Hydroxypolyether 2A". Hydroxypolyether 2A had a number average molecular weight of 2,390 and a hydroxyl value of 70.3 as determined in the same manner as in Example 1, and the functionality as hydroxyl group thereof determined from these values was 2.99. Subsequently, Hydroxypolyether 2A was reacted with trichloroacetyl isocyanate in the same manner as in Example 1, and the NMR spectrum of the resulting product was measured. As a result, a signal due to a reaction product of secondary hydroxyl group with the isocyanate was observed at 5.2 ppm based on the signal of tetramethylsilane, but no signal due to a reaction product thereof with primary hydroxyl group was observed at a position near 4.2 ppm, that is to say, the presence of any primary hydroxyl group was not confirmed in Hydroxypolyether 2A obtained in the present Example.

Subsequently, 1,200 g of Hydroxypolyether 2A was charged into the same separable flask as in Example 1, and 1,200 ml of ethyl alcohol was added under a nitrogen gas atmosphere, after which the resulting mixture was converted into a homogeneous solution and maintained at a temperature of 60° C. To the solution was gradually added 463 g (1.10 equivalents based on the secondary hydroxyl groups) of an aqueous potassium hydroxide solution having a concentration of 20% by weight with stirring over a period of 50 minutes. After completion of the addition, the stirring was further continued for about 30 minutes to carry out dehydrohalogenation treatment. After completion of the reaction, 600 ml of toluene was added, and the temperature was raised to 70° C., after which the flask was gradually evacuated while stirring its contents, to remove the water from the reaction mixture by azeotropic distillation. The salf formed was removed by filtration, and the resulting residue was concentrated to obtain 1,110 g of a colorless, liquid epoxidized polyether, which is referred to hereinafter as "Epoxidized Polyether 2B".

Epoxidized Polyether 2B had a number average molecular weight of 2,280 and a functionality f as epoxy group of 2.94 as determined in the same manner as in Example 1. The infrared absorption spectrum of Epoxidized Polyether 2B was measured, and as a result, there were observed absorptions due to ether linkage, epoxy group and oxytetramethylene unit at 1100 cm$^{-1}$, 850 cm$^{-1}$ and 740 cm$^{-1}$, respectively.

Subsequently, the NMR of Epoxidized Polyether 2B was measured by use of benzene as an internal standard substance in the same manner as in Example 1, and on the basis of the integral intensity ratio of the absorption in the vicinity of 1.6 ppm and the absorption due to benzene at 7.1 ppm and the number average molecular weight of Epoxidized Polyether 2B, the oxytetramethylene unit content by weight of Epoxidized Polyether 2B was determined to be 86%.

The chlorine atom content of Epoxidized Polyether 2B was determined in the same manner as in Example 1 to be less than the measurement limit (0.1% by weight).

EXAMPLE 3

The same 7-liter glass autoclave as in Example 1 was purged with nitrogen gas, after which 3,010 g (41.8 moles) of dehydrated tetrahydrofuran, 77.4 g (0.836 mole) of dehydrated epichlorohydrin and 29.0 g (0.322 mole) of dehydrated 1,4-butanediol were charged thereinto. At a temperature of 20° C., 59.3 g (0.418 mole) of boron trifluoride-diethyl etherate was added with stirring, and reaction was effected for 6 hours while the temperature was maintained at 20° C. The amount of unreacted tetrahydrofuran was determined by a gas chromatography to find that the conversion of tetrahydrofuran into a hydroxypolyether was 65%. Subsequently, the hydroxypolyether was recovered from the mixture in the same manner as in Example 1, which is referred to hereinafter as "Hydroxypolyether 3A". Hydroxypolyether 3A had a number average molecular weight of 5,800 and a hydroxyl value of 18.8 as determined in the same manner as in Example 1, and the functionality thereof as hydroxyl group calculated from these values was 1.95. Subsequently, Hydroxypolyether 3A was reacted with trichloroacetyl isocyanate in the same manner as in Example 1, and the NMR spectrum of the resulting product was measured. As a result, a signal due to a reaction product of secondary hydroxyl group with the isocyanate was observed at 5.2 ppm based on the signal of tetramethylsilane, but no signal due to a reaction product thereof with primary hydroxyl group was observed at a position near 4.2 ppm, that is to say, the presence of any primary hydroxyl group was not confirmed in Hydroxypolyether 3A obtained in the present Example.

Subsequently, 1,700 g of Hydroxypolyether 3A was charged into the same separable flask as in Example 1, and 1,200 ml of ethyl alcohol was added under a nitrogen gas atmosphere, after which the resulting mixture was converted into a homogeneous solution, and its temperature was maintained at 50° C. To the solution was gradually added 234 g (1.02 equivalents based on the secondary hydroxyl groups) of an aqueous sodium hydroxide solution having a concentration of 10% by weight with stirring over a period of 1 hour. After completion of the addition, the stirring was further continued for 40 minutes to carry out dehydrohalogenation treatment. After completion of the reaction, 800 ml of toluene was added, and 1,580 g of an epoxidized polyether was obtained in the same manner as in Example 1, which is referred to hereinafter as "Epoxidized Polyether 3B".

Epoxidized Polyether 3B had a number average molecular weight of 5,730 and a functionality f as epoxy group of 1.91 as determined in the same manner as in Example 1.

Subsequently, the NMR spectrum of Epoxidized Polyether 3B was measured by use of benzene as an internal standard substance in the same manner as in Example 1, and on the basis of the integral intensity ratio of an absorption in the vicinity of 1.6 ppm and an absorption due to benzene at 7.1 ppm and the number average molecular weight of Epoxidized Polyether 3B, the oxytetramethylene unit content by weight of Epoxidized Polyether 3B was determined to be 96%.

The chlorine atom content of Epoxidized Polyether 3B was determined in the same manner as in Example 1 to be 0.2% by weight. Accordingly, the residual amount of chlorine atoms (the average number) contained in one molecule of Epoxidized Polyether 3B was found as very small as $$\frac{0.2 \times 5{,}730}{35.5 \times 100} \approx 0.32.$$

EXAMPLE 4

The same 7-liter glass autoclave as in Example 1 was purged with nitrogen gas, after which 3,010 g (41.8 moles) of dehydrated tetrahydrofuran, 155 g (1.67 moles) of dehydrated epichlorohydrin and 57.7 g (0.93 mole) of dehydrated ethylene glycol were charged thereinto. At a temperature of 20° C., 234 g (1.67 moles) of a boron trifluoride-tetrahydrofuran complex was added with stirring, and reaction was effected for 4 hours while the temperature was maintained at 20° C. The amount of unreacted tetrahydrofuran was determined by a gas chromatography to find that the conversion of tetrahydrofuran into a hydroxypolyether was 75%. Subsequently, the hydroxypolyether was recovered from the mixture in the same manner as in Example 1, which is referred to hereinafter as "Hydroxypolyether 4A". Hydroxypolyether 4A had a number average molecular weight of 2,730 and a hydroxyl value of 40.0 as determined in the same manner as in Example 1, and the functionality as hydroxyl group thereof calculated from these values was 1.95. Subsequently, Hydroxypolyether 4A was reacted with trichloroacetyl isocyanate in the same manner as in Example 1, and the NMR spectrum of the resulting product was measured. As a result, a signal due to a reaction product of secondary hydroxyl group with the isocyanate was observed at 5.2 ppm based on the signal of tetramethylsilane, and a signal due to a reaction product thereof with primary hydroxyl group was faintly observed even at a position near 4.2 ppm. From the integral intensity ratio of the two, it was found that Hydroxypolyether 4A obtained in the present Example had about 94% of secondary hydroxyl group and about 6% of primary hydroxyl group.

Subsequently, 1,200 g of Hydroxypolyether 4A was subjected to dehydrohalogenation treatment in the same manner as in Example 2, except that the amount of the aqueous potassium hydroxide solution was 252 g (1.11 equivalents based on the secondary hydroxyl groups), to obtain 1,140 g of a colorless, liquid epoxidized polyether, which is referred to hereinafter as "Epoxidized Polyether 4B".

Epoxidized Polyether 4B had a number average molecular weight of 2,660 and a functionality f as epoxy group of 1.92 as determined in the same manner as in Example 1.

Subsequently, the NMR spectrum of Epoxidized Polyether 4B was measured by use of benzene as an internal standard substance in the same manner as in Example 1, and on the basis of the integral intensity ratio of an absorption in the vicinity of 1.6 ppm and an absorption due to benzene at 7.1 ppm and the number average molecular weight of Epoxidized Polyether 4B, the oxytetramethylene unit content by weight of Epoxidized Polyether 4B was determined to be 91%.

The chlorine atom content of Epoxidized Polyether 4B was determined in the same manner as in Example 1 to be less than the measurement limit (0.1% by weight).

EXAMPLE 5

The same 7-liter glass autoclave as in Example 1 was purged with nitrogen gas, after which 3,010 g (41.8 moles) of dehydrated tetrahydrofuran, 116 g (1.25 moles) of dehydrated epichlorohydrin and 48.9 g (0.543 mole) of dehydrated 1,4-butanediol were charged thereinto. At a temperature of 20° C., 149 g (1.05 moles) of boron trifluoride-diethyl etherate was added with stirring, and reaction was effected for 6 hours while the temperature was maintained at 20° C. The amount of unreacted tetrahydrofuran was determined by a gas chromatography to find that the conversion of tetrahydrofuran into a hydroxypolyether was 79%. Subsequently, the hydroxypolyether was recovered from the mixture in the same manner as in Example 1, which is referred to hereinafter as "Hydroxypolyether 5A". Hydroxypolyether 5A had a number average molecular weight of 4,540 and a hydroxyl value of 23.9 as determined in the same manner as in Example 1, and the functionality as hydroxyl group was determined as 1.94 from these values. Subsequently, Hydroxypolyether 5A was reacted with trichloroacetyl isocyanate in the same manner as in Example 1, and the NMR spectrum of the reaction product was measured. As a result, a signal due to a reaction product of secondary hydroxyl group with the isocyanate was observed at 5.2 ppm based on the signal of tetramethylsilane, but no signal due to a reaction product thereof with primary hydroxyl group was observed at a position near 4.2 ppm, that is to say, the presence of any primary hydroxyl group was not confirmed in Hydroxypolyether 5A obtained in the present Example.

Subsequently, 1,600 g of Hydroxypolyether 5A was charged into the same separable flask as in Example 1, and 1,500 ml of tertiary butyl alcohol was added under a nitrogen gas atmosphere, after which the resulting mixture was converted into a homogeneous solution, and its temperature was maintained at 50° C. To the solution was gradually added 287 g (1.05 equivalents based on the secondary hydroxyl groups) of an aqueous sodium hydroxide solution having a concentration of 10% by weight with stirring over a period of 1 hour. After completion of the addition, the stirring was further continued for 40 minutes to carry out dehydrohalogenation treatment. After completion of the reaction, 800 ml of toluene was added, and 1,520 g of an epoxidized polyether was obtained in the same manner as in Example 1, which is referred to hereinafter as "Epoxidized Polyether 5B".

Epoxidized Polyether 5B had a number average molecular weight of 4,460 and a functionality f as epoxy group of 1.92 as determined in the same manner as in Example 1.

Subsequently, the NMR spectrum of Epoxidized Polyether 5B was measured by use of benzene as an internal standard substance in the same manner as in Example 1, and on the basis of the integral intensity ratio of an absorption in the vicinity of 1.6 ppm and an absorption due to benzene at 7.1 ppm and the number averge molecular weight of Epoxidized Polyether 5B, the oxytetramethylene unit content by weight of Epoxidized Polyether 5B was determined to be 95%.

The chlorine atom content of Epoxidized Polyether 5B was determined in the same manner as in Example 1 to be 0.1% by weight. Accordingly, the residual amount of chlorine atoms (the average number) contained in one molecule of Epoxidized Polyether 5B was found as very small as $$\frac{0.1 \times 4,460}{35.5 \times 100} \approx 0.13.$$

EXAMPLE 6

The same 7-liter glass autoclave as in Example 1 was purged with nitrogen gas, after which 3,010 g (41.8 moles) of dehydrated tetrahydrofuran, 82.3 g (0.914 mole) of dehydrated 1,4-butanediol and 59.3 g (0.418 mole) of boron trifluoride-diethyl etherate were charged thereinto. At a temperature at 25° C., 171 g (1.85 moles) of dehydrated epichlorohydrin was gradually added with stirring over a period of 2 hours, and the resulting mixture was further subjected to reaction for 4.5 hours while maintaining the temperature at 25° C. The amount of unreacted tetrahydrofuran was determined by a gas chromatography to find that the conversion of tetrahydrofuran into a hydroxypolyether was 43%. Subsequently, the hydroxypolyether was recovered from the mixture in the same manner as in Example 1, which is referred to hereinafter as "Hydroxypolyether 6A". Hydroxypolyether 6A had a number average molecular weight of 1,710 and a hydroxyl value of 65.5 as determined in the same manner as in Example 1, and the functionality as hydroxyl group thereof was determined to be 2.0 from these values. Subsequently, Hydroxypolyether 6A was reacted with trichloroacetyl isocyanate in the same manner as in Example 1, and the NMR spectrum of the resulting product was measured. As a result, a signal due to a reaction product of secondary hydroxyl group with the isocyanate was observed at 5.2 ppm based on the signal of tetramethylsilane, but no signal due to a reaction product of primary hydroxyl group with the isocyanate was observed at a position near 4.2 ppm, that is to say, the presence of any primary hydroxyl group was not confirmed in Hydroxypolyether 6A obtained in the present Example.

Subsequently, 1,050 g of Hydroxypolyether 6A was charged into the same separable flask as in Example 1, and 1,000 ml of ethyl alcohol was added under a nitrogen gas atmosphere, after which the resulting mixture was converted into a homogeneous solution, and its temperature was maintained at 50° C. To the solution was gradually added 491 g (1.00 equivalent based on the secondary hydroxyl groups) of an aqueous sodium hydroxide solution having a concentration of 10% by weight with stirring over a period of 1 hour. After completion of the addition, the stirring was further continued for 40 minutes to carry out dehydrohalogenation treatment. After completion of the reaction, 800 ml of toluene was added, and 960 g of an epoxidized polyether was obtained in the same manner as in Example 1, which is referred to hereinafter as "Epoxidized Polyether 6B".

Epoxidized Polyether 6B had a number average molecular weight of 1,640 and a functionality f as epoxy group of 1.97 as determined in the same manner as in Example 1.

Subsequently, the NMR spectrum of Epoxidized Polyether 6B was measured by use of benzene as an internal standard substance in the same manner as in Example 1, and on the basis of the integral intensity ratio of an absorption in the vicinity of 1.6 ppm and an absorption due to benzene at 7.1 ppm and the number average molecular weight of Epoxidized Polyether 6B, the oxytetramethylene unit content by weight of Epoxidized Polyether 6B was determined to be 93%.

The chlorine atom content of Epoxidized Polyether 6B was determined in the same manner as in Example 1 to be less than the measurement limit (0.1% by weight).

Further, the infrared absorption spectrum of Epoxidized Polyether 6B was measured, and as a result, an absorption due to oxytetramethylene unit was observed at 740 cm$^{-1}$. The relationship between the oxytetramethylene unit content by weight and the absorption intensity was obtained by using polyoxytetramethylene glycol as a standard substance, and by use of said relationship, the oxytetramethylene unit content by weight of Epoxidized Polyether 6B was determined to be about 94%. This result is about the same value as that of the analysis result of the above NMR spectrum.

EXAMPLE 7

The same 7-liter glass autoclave as in Example 1 was purged with nitrogen gas, after which 3,010 g (41.8 moles) of dehydrated tetrahydrofuran, 86.8 g (0.522 mole) of dehydrated diglycerol and 292 g (2.09 moles) of a boron trifluoride-tetrahydrofuran complex were charged thereinto. At a temperature of 20° C., 294 g (2.15 moles) of dehydrated epibromohydrin was gradually added with stirring over a period of 2 hours, and the resulting mixture was further subjected to reaction for 3 hours while the temperature was maintained at 20° C. The amount of unreacted tetrahydrofuran was determined by a gas chromatography to find that the conversion of tetrahydrofuran into a hydroxypolyether was 51%. From the mixture was recovered hydroxypolyether in the same manner as in Example 1, which is referred to as hereinafter as "Hydroxypolyether 7A". The average molecular weight of Hydroxypolyether 7A determined in the same manner as in Example 1 was 3,670 and the hydroxyl value was 59.9. The functionality as hydroxyl group determined from these values was 3.92. Subsequently, Hydroxypolyether 7A was reacted with trichloroacetyl isocyanate in the same manner as in Example 1, and the NMR spectrum of the resulting product was measured. As a result, a signal due to a reaction product of secondary hydroxyl group with the isocyanate was observed at 5.2 ppm based on the signal of tetramethylsilane, but no signal due to a reaction product of primary hydroxyl group with the isocyanate was observed at a position near 4.2 ppm, that is to say, the presence of any primary hydroxyl group was not confirmed in the Hydroxypolyether 7A.

Subsequently, 1,300 g of Hydroxypolyether 7A was charged into the same separable flask as in Example 1, and 1,300 ml of ethyl alcohol was added under a nitrogen gas atmosphere, after which the resulting mixture was converted into a homogeneous solution and its temperature was maintained at 50° C. To the solution was gradually added 583 g (1.05 equivalents based on the secondary hydroxyl groups) of an aqueous sodium hydroxide solution having a concentration of 10% by weight with stirring over a period of 1 hour. After completion of the addition, the stirring was further continued for 40 minutes to carry out dehydrohalogenation treatment. After completion of the reaction, 800 ml of toluene was added, and, 1,205 g of an epoxidized polyether was obtained in the same manner as in Example 1, which is referred to hereinafter as "Epoxidized Polyether 7B".

Epoxidized Polyether 7B had a number average molecular weight of 3,510 and a functionality f as epoxy group of 3.89 as determined in the same manner as in Example 1.

Subsequently, the NMR spectrum of Epoxidized Polyether 7B was measured by use of benzene as an internal standard substance in the same manner as in Example 1, and on the basis of the integral intensity ratio of an absorption in the vicinity of 1.6 ppm and an absorption due to benzene at 7.1 ppm and the number average molecular weight of Epoxidized Polyether 7B, the oxytetramethylene unit content by weight of Epoxidized Polyether 7B was determined to be 87%.

The bromine atom content of Epoxidized Polyether 7B was determined in the same manner as in Example 1 to be less than the measurement limit (0.1% by weight).

EXAMPLE 8

A 5-liter separable flask equipped with a stirrer, a coiled condenser, a dropping funnel, a thermometer and an inlet and an outlet for nitrogen gas was purged with nitrogen gas, after which 800 g (0.748 mole) of a dehydrated polyoxytetramethylene glycol having a number average molecular weight of 1,070, 1 liter of dehydrated dioxane and 42.4 g (0.299 mole) of boron trifluoride-diethyl etherate were charged thereinto. Subsequently, 152 g (1.64 moles) of dehydrated epichlorohydrin was added with stirring from the dropping funnel over a period of 2 hours while maintaining the temperature of the mixture at 15° C. by means of the coiled condenser. After completion of the dropwise addition, the stirring was further continued for 5 hours, after which the reaction was terminated by adding 1 liter of distilled water. To the reaction solution was added 1.5 liters of toluene, and the resulting mixture was stirred for 15 minutes and then allowed to stand, after which the separated aqueous layer fraction was removed. To the thus obtained oil layer fraction was added 1 liter of distilled water, and the resulting mixture was stirred for 15 minutes and then allowed to stand, after which the separated aqueous layer fraction was removed. The same procedure as described above was further repeated twice to conduct washing until the pH of the resulting separated aqueous layer fraction became 7, after which the organic layer fraction was taken out and then filtered through a filter paper. The toluene was completely removed by distillation from the resulting filtrate by means of a rotary evaporator to obtain 910 g of a colorless, liquid hydroxypolyether, which is referred to hereinafter as "Hydroxypolyether 8A". Hydroxypolyether 8A had a number average molecular weight of 1,280 and a hydroxyl value of 86.3 as determined in the same manner as in Example 1, and the functionality as hydroxyl group thereof determined from these values was 1.97. Subsequently, "Hydroxypolyether 8A" was reacted with trichloroacetyl isocyanate in the same manner as in Example 1, and the NMR spectrum of the resulting product was measured and then analyzed to find that 97% of the hydroxyl groups were secondary and the balance 3% thereof were primary.

Subsequently, 700 g of Hydroxypolyether 7A was charged into the same 5-liter separable flask as in Example 1, and 700 ml of ethyl alcohol was added under a nitrogen gas atmosphere, after which the resulting mixture was converted into a homogeneous solution, and its temperature was maintained at 50° C. To the solution was gradually added 435 g (1.04 equivalents based on the secondary hydroxyl groups) of an aqueous sodium hydroxide solution having a concentration of 10% by weight with stirring over a period of 1 hour. After completion of the addition, the stirring was further continued for 40 minutes to carry out dehydrohalogenation treatment. After completion of the reaction, 800 ml of toluene was added, and 610 g of an epoxidized polyether was obtained in the same manner as in Example 1, which is referred to hereinafter as "Epoxidized Polyether 8B".

Epoxidized Polyether 8B had a number average molecular weight of 1,180 and a functionality f as epoxy group of 1.90 as determined in the same manner as in Example 1.

Subsequently, the NMR spectrum of Epoxidized Polyether 8B was measured by use of benzene as an internal standard substance in the same manner as in Example 1, and on the basis of the integral intensity ratio of an absorption in the vicinity of 1.6 ppm and an absorption due to benzene at 7.1 ppm and the number average molecular weight of Epoxidized Polyether 8B, the oxytetramethylene unit content by weight of Epoxidized Polyether 8B was determined to be 90%.

The chlorine atom content of Epoxidized Polyether 8B was determined in the same manner as in Example 1 to be 0.3% by weight. Accordingly, the residual number of chlorine atoms (the average number) contained in one molecule of Epoxidized Polyether 8B was found as very small as $$\frac{0.3 \times 1,180}{35.5 \times 100} = 0.10.$$

EXAMPLE 9

The same 5-liter separable flask as in Example 8 was purged with nitrogen gas, after which 930 g (0.477 mole) of dehydrated polyoxytetramethylene glycol having a number average molecular weight of 1950, 1 liter of dehydrated dioxane and 22.7 g (0.194 mole) of a boron trifluoride-tetrahydrofuran complex were charged thereinto. Subsequently, while keeping the temperature of the mixture at 20° C. by means of the coiled condenser, 137 g (1.00 mole) of dehydrated epibromohydrin was dropped thereinto from a dropping funnel with stirring over 1.5 hours. After completion of the dropwise addition, the stirring was continued for a further 4 hours, and 1 liter of distilled water was then added to terminate the reaction. Subsequently, the same procedure as in Example 8 was repeated to obtain 1,020 g of colorless, liquid hydroxypolyether from the mixture. This hydroxypolyether is referred to hereinafter as "Hydroxypolyether 9A". Hydroxypolyether 9A had a number average molecular weight of 2,240 and a hydroxyl value of 49.1 as determined in the same manner as in Example 1, and the functionality as hydroxyl group thereof determined from these values was 1.96. Subsequently, Hydroxypolyether 9A was reacted with trichloroacetyl isocyanate in the same manner as in Example 1, and the NMR spectrum of the resulting product was measured and then analyzed to find that 96% of the hydroxyl groups were secondary and the balance 4% thereof were primary.

Subsequently, 800 g of Hydroxypolyether 9A was charged into the same 5-liter separable flask as in Example 1, after which 750 ml of ethyl alcohol was added thereto under a nitrogen atmosphere to form a uniform solution, and the temperature thereof was kept at 50° C. To the solution was gradually added 396 g of an aqueous potassium hydroxide solution of a concentration of 10% by weight (1.05 equivalents based on the secondary hydroxyl groups) with stirring over one hour. After completion of the addition, the stirring was continued for a further 40 minutes to subject the solution to dehaloganation treatment. After completion of the reaction, 800 ml of toluene was added thereto and the same procedure as in Example 1 was repeated to obtain 705 g of epoxidized polyether. This is referred to hereinafter as "Epoxidized Polyether 9B".

Epoxidized Polyether 9B had a number average molecular weight of 2,070 and a functionality f as epoxy group of 1.92 as determined in the same manner as in Example 1.

Subsequently, the NMR spectrum of Epoxidized Polyether 9B was measured by use of benzene as an internal standard substance in the same manner as in Example 1, and on the basis of the integral intensity ratio of an absorption in the vicinity of 1.6 ppm and an absorption due to benzene at 7.1 ppm and the number average molecular weight of Epoxidized Polyether 9B, the oxytetramethylene unit content by weight of Epoxidized Polyether 9B was determined to be 94%.

The chlorine atom content of Epoxidized Polyether 9B was determined in the same manner as in Example 1 to be less than the measurement limit (0.1% by weight).

EXAMPLE 10

A 7-liter stainless steel autoclave equipped with a stirrer, a coiled condenser, a thermometer and an inlet and an outlet for nitrogen gas was purged with nitrogen gas, after which 3,000 g (41.7 moles) of dehydrated tetrahydrofuran, 175 g (1.89 moles) of dehydrated epichlorohydrin and 84.2 g (1.83 moles) of dehydrated ethyl alcohol were charged thereinto. Subsequently, 12.2 g (0.180 mole) of boron trifluoride gas was added from a bomb with stirring, while the mixture was maintained at a temperature of 17° C., and reaction was effected at a temperature of 17° C. for 5 hours, after which the reaction was terminated by the addition of 2 liters of distilled water. After completion of the reaction, the amount of unreacted tetrahydrofuran was determined by a gas chromatography to find that the conversion of tetrahydrofuran into a hydroxypolyether was 46%. Subsequently, in the same manner as in Example 1, 1,580 g of hydroxypolyether was recovered from the mixture. This hydroxypolyether is referred to hereinafter as "Hydroxypolyether 10A".

The number average molecular weight of Hydroxypolyether 10A was measured, by means of a vapor pressure osmosis type apparatus for measuring molecular weight, to find it to be 880. The hydroxyl value thereof obtained in the same manner as in Example 1 was 63.7 (mgKOH/g). The number of hydroxyl groups per molecule of Hydroxypolyether 10A calculated from the number average molecular weight and the hydroxyl value, namely, the functionality thereof as hydroxyl group was 1.0.

Subsequently, 0.4 g of Hydroxypolyether 10A and 0.4 g of trichloroacetyl isocyanate were reacted with each other and the NMR spectrum of the resulting product was measured in the same manner as in Example 1. As a result, the presence of primary hydroxyl groups was not confirmed in the hydroxypolyether obtained in the present Example.

Subsequently, from 1,200 g of Hydroxypolyether 10A, 1,000 ml of ethyl alcohol and 562 g (1.03 equivalents based on the secondary hydroxyl groups) of an aqueous sodium hydroxide solution having a concentration of 10% by weight was obtained 1,100 g of colorless, liquid expoxidized polyether in the same manner as in Example 1. This epoxidized polyether is referred to hereinafter as "Epoxidized Polyether 10B".

The number average molecular weight of Epoxidized Polyether 10B was 840, and the functionality f as epoxy group thereof was 0.99.

In the same manner as in Example 1, the oxytetramethylent unit content by weight in Epoxidized Polyether 10B was measured to find it to be 87%. Furthermore, the chlorine atom content of Epoxidized Polyether was measured to find it to be less than the measurement limit.

EXAMPLE 11

The same 7-liter stainless steel autoclave as in Example 10 was purged with nitrogen gas, after which 3,050 g (42.4 moles) of dehydrated tetrahydrofuran, 190 g (2.05 moles) of dehydrated epichlorohydrin and 88.2 g (0.980 mole) of dehydrated 1,4-butanediol were charged thereinto. At a temperature of 20° C., 25.2 g (0.200 mole) of phosphorus pentafluoride gas generated from phosphorus pentachloride was added with stirring, and reaction was effected for 4 hours while keeping the temperature at 20° C., after which 2 liters of distilled water was added to terminate the reaction. After completion of the reaction, the amount of unreacted tetrahydrofuran was determined by a gas chromatography to find that the conversion of tetrahydrofuran into a hydroxypolyether was 43%. Subsequently, about 1,498 g of colorless, liquid hydroxypolyether was recovered from the mixture in the same manner as in Example 1, which is referred to hereinafter as "Hydroxypolyether 11A". Hydroxypolyether 11A had a number average molecular weight of 1,580 and a hydroxyl value of 70.7 as determined in the same manner as in Example 1, and the functionality as hydroxyl group thereof determined from these values was 1.99. Subsequently, Hydroxypolyether 11A was reacted with trichloroacetyl isocyanate in the same manner as in Example 1, and the NMR spectrum of the resulting product was measured. As a result, the presence of any primary hydroxyl group was not confirmed in Hydroxypolyether 11A.

Subsequently, from 1,100 g of Hydroxypolyether 11A, 565 g (1.02 equivalents based on the hydroxyl groups) of an aqueous sodium hydroxide solution having a concentration of 10% by weight and 950 ml of ethyl alcohol was obtained 990 g of epoxidized polyether in the same manner as in Example 1. This is referred to hereinafter as "Epoxidized Polyether 11B".

Epoxidized Polyether 11B had a number average molecular weight of 1,510 and a functionality f as epoxy group of 1.96 as determined in the same manner as in Example 1. Moreover, the oxytetramethylene unit content by weight of Epoxidized Polyether 11B was determined to be 90%, and the chlorine atom content of Epoxidized Polyether 11B was only 0.2% by weight.

EXAMPLE 12

A mixture of 50 g of Epoxidized Polyether 1B obtained in Example 1, 50 g of bisphenol A type epoxy resin (epoxy equivalent: 190) and 7 g of triethylenetetramine was subjected to reaction at 40° C. for 10 days to obtain a cured product. The tensile strength of this cured product was 410 kg/cm$^2$ and the elongation thereof was 8%.

On the other hand, from 100 g of bisphenol A type epoxy resin (epoxy equivalent: 190) and 10 g of triethylenetetramine was obtained a cured product, which had a tensile strength of 460 kg/cm$^2$ and an elongation of 2%.

EXAMPLE 13

A mixture of 40 g of Epoxidized Polyether 2B obtained in Example 2, 60 g of bisphenol A type epoxy resin (epoxy equivalent: 190), 60 g of a mixture (9:1 by weight of tetrahydrophthalic anhydride and hexahydrophthalic anhydride, and 1 g of tris(dimethylaminomethyl)phenol was subjected to reaction at 100° C. for 2 hours and then at 130° C. for 4 hours to obtain a cured product. This cured product had a tensile strength of 640 kg/cm² and an elongation of 7%. On the other hand, the cured product obtained from 100 g of bisphenol A type epoxy resin (epoxy equivalent: 190), 80 g of a mixture (9:1 by weight) of tetrahydrophthalic anhydride and hexahydrophthalic anhydride and 1 g of tris(dimethylaminomethyl)phenol in the same manner as above had a tensile strength of 720 kg/cm² and an elongation of only 1%.

What is claimed is:

1. A process for producing an epoxidized polyehter containing oxytetramethylene units and having in one molecule 0.9 or more epoxy groups on the average represented by the general formula (I):

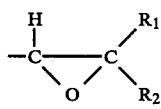

(I)

wherein $R_1$ and $R_2$, which may be the same or different, are hydrogen atoms or alkyl groups, which comprises polymerizing tetrahydrofuran, in the presence or absence of an inert solvent, in the presence of (A) a component consisting of a Lewis acid, an ether complex of a Lewis acid or both of them, (B) a component consisting of an epihalohydrin, and (C) a component consisting of a compound having in one molecule one or more hydroxyl groups, thereby obtaining a hydroxypolyether, and then subjecting it to dehydrohalogenation treatment.

2. A process for producing an epoxidized polyether containing oxytetramethylene units and having in one molecule 0.9 or more epoxy groups on the average represented by the general formula (I):

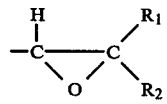

(I)

wherein $R_1$ and $R_2$, which may be the same or different, are hydrogen atoms or alkyl groups, which comprises subjecting a polyoxytetramethylene glycol to reaction, in the presence or absence of an inert solvent, together with (D) a component consisting of a Lewis acid, an ether complex of a Lewis acid, or both of them, and (E) a component consisting of an epihalohydrin, thereby obtaining a hydroxypolyether, and then subjecting it to dehydrohalogenation treatment.

3. An epoxidized polyether containing oxytetramethylene units and having in one molecule 0.9 or more epoxy groups on the average and represented by the general formula (I):

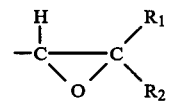

(I)

wherein $R_1$ and $R_2$, which may be the same or different, are hydrogen atoms or alkyl groups said polyether being prepared according to the processes of claims 1 or 2.

4. An epoxidized polyether according to claim 3, wherein the oxytetramethylene units are contained in an amount of 60% by weight or more.

5. An epoxidized polyether according to claim 3, wherein the oxytetramethylene units are contained in an amount of 70% by weight or more.

6. An epoxidized polyether according to claim 3, wherein the number average number of the epoxy groups of the general formula (I) contained in one molecule is 0.9 to 10.

7. An epoxidized polyether according to claim 3, which has a number average molecular weight of 300 to 20,000.

8. An epoxidized polyether according to claim 3, which has a number average molecular weight of 500 to 10,000.

9. An epoxidized polyether according to claim 3, wherein the average number of halogen atoms contained in one molecule of the epoxidized polyether is equal to or less than a value (N) given by the equation (III):

$$N = 3 \times f - S \quad (III)$$

wherein f is the functionality of the epoxidized polyether as epoxy group expressed by, and S is the average number of secondary hydroxyl groups present in one molecule of the epoxidized polyether which are represented by the structural formula (II):

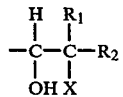

(II)

wherein $R_1$ and $R_2$, which may be the same or different, are hydrogen atoms or alkyl groups, and X is a halogen atom.

* * * * *